United States Patent
Kim et al.

(10) Patent No.: US 8,766,809 B2
(45) Date of Patent: Jul. 1, 2014

(54) APPARATUS AND METHOD FOR CORRECTING ERROR OF ACQUIRED DATA

(71) Applicant: LSIS Co., Ltd., Anyang-si (KR)

(72) Inventors: Young In Kim, Seoul (KR); Yoon Sung Cho, Pyungtaek-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/772,250

(22) Filed: Feb. 20, 2013

(65) Prior Publication Data

US 2013/0214927 A1   Aug. 22, 2013

(30) Foreign Application Priority Data

Feb. 22, 2012   (KR) ........................ 10-2012-0017949

(51) Int. Cl.
   *G08B 21/00*   (2006.01)

(52) U.S. Cl.
   USPC ............................................ 340/638; 700/80

(58) Field of Classification Search
   USPC .................. 340/638; 700/80; 703/2; 709/224
   See application file for complete search history.

(56) References Cited

U.S. PATENT DOCUMENTS

2009/0149972 A1*   6/2009   Nasle ............................. 700/80

FOREIGN PATENT DOCUMENTS

| JP | 07-095736 | 4/1995 |
| KR | 200265897 | 2/2002 |
| KR | 20090089631 | 8/2009 |

OTHER PUBLICATIONS

Korean Intellectual Property Office Application Serial No. 10-2012-0017949, Notice of Allowance dated Sep. 27, 2013, 1 page.
European Patent Office Application Serial No. 13155885.0, Search Report dated Jul. 5, 2013, 6 pages.
Korean Intellectual Property Office Application Serial No. 10-2012-0017949, Office Action dated May 16, 2013, 3 pages.
Japan Patent Office Application Serial No. 2013-033628, Notice of Allowance dated Feb. 18, 2014, 3 pages.

* cited by examiner

*Primary Examiner* — Shirley Lu
(74) *Attorney, Agent, or Firm* — Lee, Hong, Degerman, Kang & Waimey

(57) ABSTRACT

Disclosed are an apparatus for correcting an error of acquired data and a method thereof. The method includes determining whether states of at least one circuit breaker and at least one disconnecting switch included in at least one station are consistent with each other based on data received from at least one remote control apparatus including the at least one station; assigning a weight to a corresponding circuit breaker and a corresponding disconnecting switch and the station including the corresponding circuit breaker and the corresponding disconnecting switch when the determination result represents that the states of the circuit breaker and the disconnecting switch are inconsistent with each other; creating alarm information notifying a malfunction of the corresponding circuit breaker and the corresponding disconnecting switch when an accumulated weight value is equal to or greater than a preset reference weight value; and outputting an alarm corresponding to the alarm information.

14 Claims, 2 Drawing Sheets

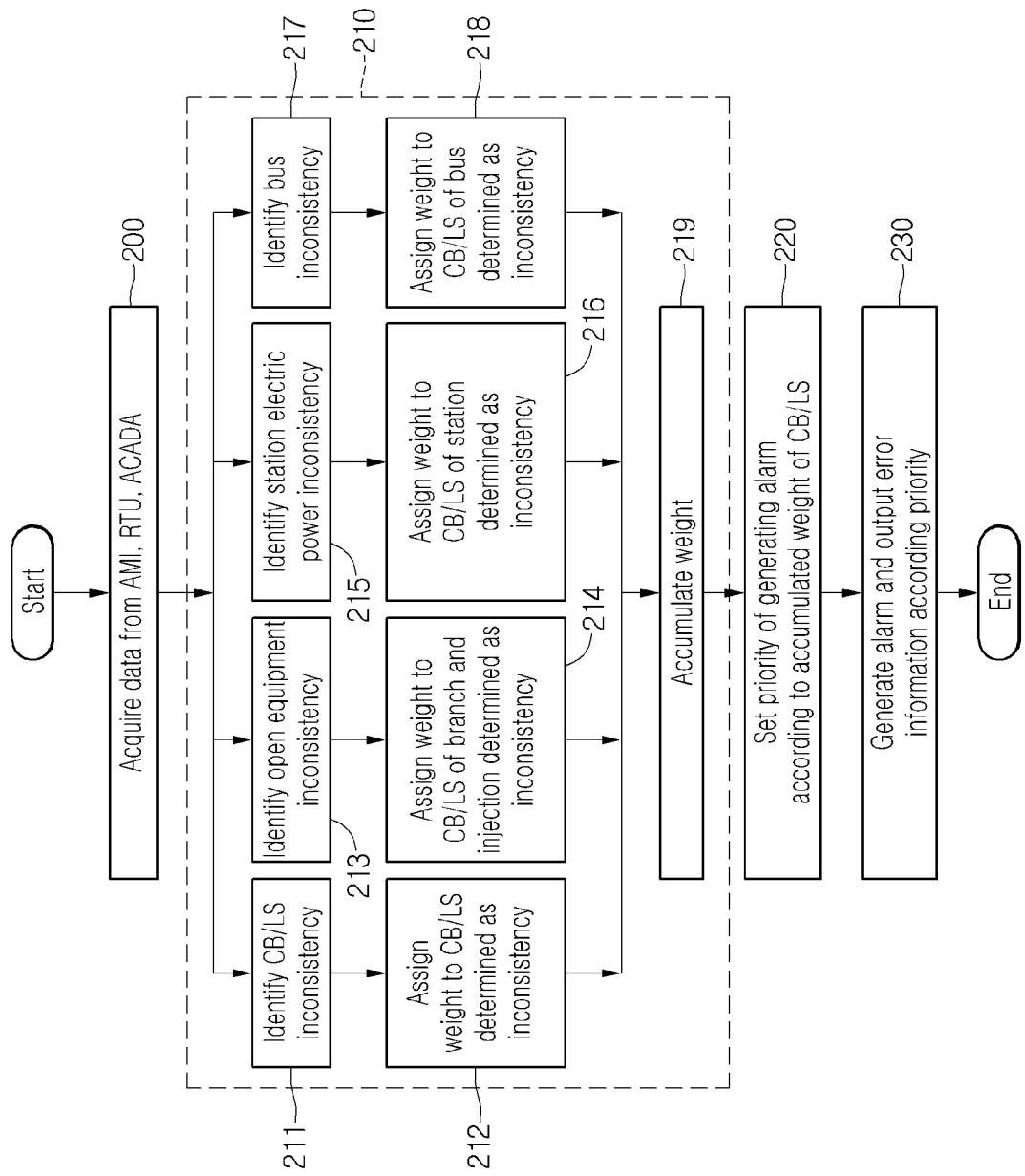

APPARATUS AND METHOD FOR CORRECTING ERROR OF ACQUIRED DATA

CROSS-REFERENCE TO RELATED APPLICATIONS

Pursuant to 35 U.S.C. §119(a), this application claims the benefit of earlier filing date and right of priority to Korean Patent Application No. 10-2012-0017949, filed on Feb. 22, 2012, the contents of which are hereby incorporated by reference herein in their entirety.

BACKGROUND

The embodiment relates to an apparatus and a method for correcting an error of acquired data, and more particularly, to an apparatus which identifies whether an error occurs in data received from a field in an energy management system and corrects the error and a method thereof.

A data acquisition system has been used in various operation systems such as an energy management system, a distribution automation system and a railway system through SCADA (Supervisory Control and Data Acquisition), AMI (Advance Metering Infrastructure) or RTU (Remote Terminal Unit).

The data acquisition system is an operation system which may perform data formation about a real situation and stores the data in a database and may provide visual data and various analysis results to an administrator.

Topology may be constructed by using the data acquired through the data acquisition system and a link may be constructed between equipment. If an error occurs in the link between equipment, a correction for the error is performed.

According to the related art, an inconsistency inspection for a circuit breaker and a disconnecting switch is performed to correct an error in the acquired data. At this time, in the case of the energy management system, there is serious problem because about 60 thousand circuit breakers and disconnecting switches must be inspected. For this reason, circuit breakers and disconnecting switches are arbitrarily selected and the inspection for the selected circuit breakers and disconnecting switches are performed. Therefore, it is difficult to stably operate the system and to ensure the reliability of the system.

SUMMARY

The embodiment provides an apparatus for correcting an error of acquired data, which generates an alarm for an error of abnormal history data in a data acquisition system to ensure stability and efficiency of a system and a method thereof.

Further, the embodiment provides an apparatus for correcting an error of acquired data, which determines states of a circuit breaker and a disconnecting switch with reference to data input from a remote control system and generates an alarm according to the determination result, and a method thereof.

In addition, the embodiment provides an apparatus for correcting an error of acquired data, which can identify and correct an error of a remote control system by determining states of a circuit breaker and a disconnecting switch with reference to data input from a remote control system and generating an alarm according to the determination result, and a method thereof.

Meanwhile, the technical objects to be accomplished in suggested embodiments are not limited to the above objects, and other objects can be clearly comprehended from the following description by those skilled in the art.

The embodiment provides a method of correcting an error of acquired data. The method includes determining whether states of at least one circuit breaker and at least one disconnecting switch included in at least one station are consistent with each other based on data received from at least one remote control apparatus including the at least one station; assigning a weight to a corresponding circuit breaker and a corresponding disconnecting switch and the station including the corresponding circuit breaker and the corresponding disconnecting switch when the determination result represents that the states of the circuit breaker and the disconnecting switch are inconsistent with each other; creating alarm information notifying a malfunction of the corresponding circuit breaker and the corresponding disconnecting switch when an accumulated weight value is equal to or greater than a preset reference weight value; and outputting an alarm corresponding to the alarm information.

Meanwhile, the embodiment provides an apparatus for correcting an error of acquired data. The apparatus includes a communication unit for receiving data generated from at least one remote control apparatus including at least one station; an error determining unit for determining whether states of at least one circuit breaker and at least one disconnecting switch included in the station are consistent with each other based on the data received through the communication unit and assigning a weight according to a determination result; a memory unit for storing an accumulated weight of the circuit breaker and the disconnecting switch assigned by the error determining unit; and a control unit for identifying the accumulated weight that is accumulated according to state consistency of the circuit breaker and the disconnecting switch determined by the error determining unit and identifying an error of the station including the circuit breaker and the disconnecting switch based on the accumulated weight.

BRIEF DESCRIPTION OF THE DRAWINGS

FIG. 2 is a flowchart illustrating the operation of correcting an error of acquired data according to the embodiment.

DETAILED DESCRIPTION OF THE EMBODIMENTS

Figure 1:
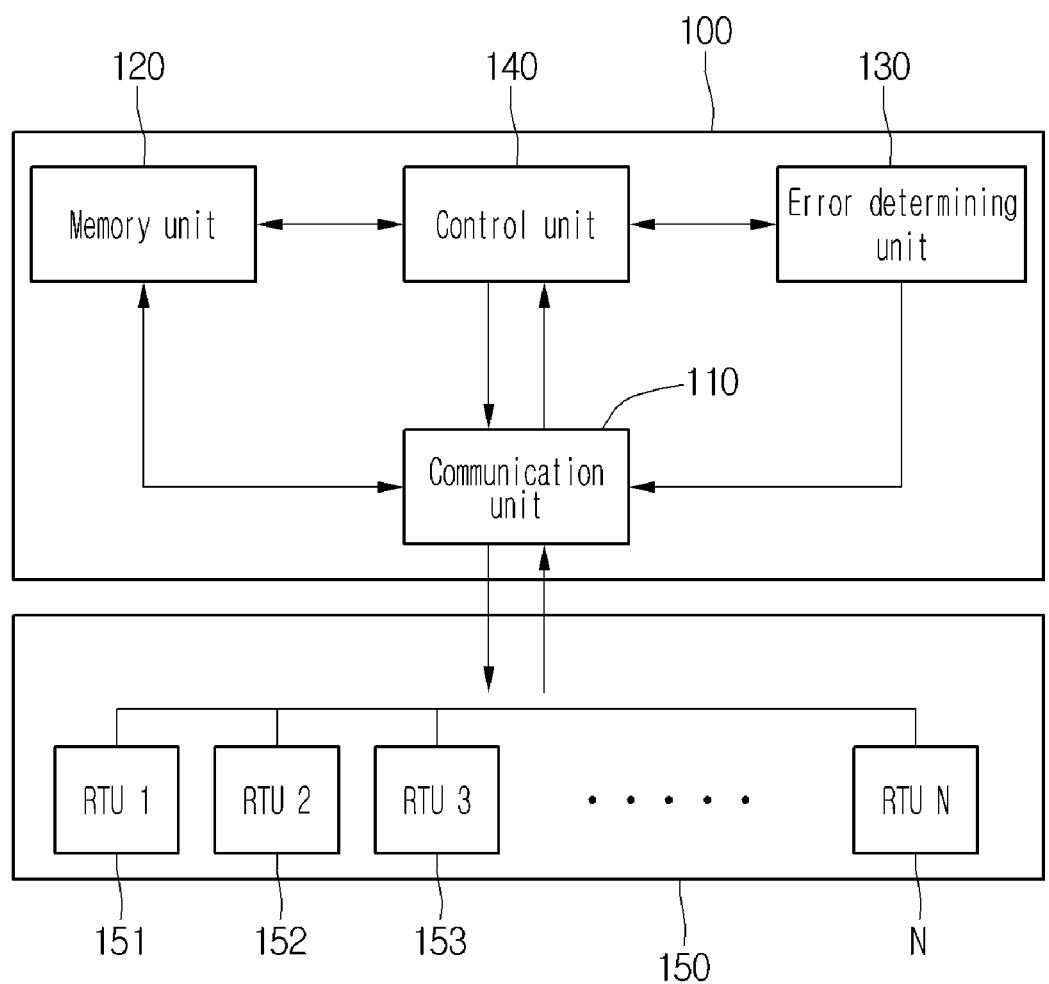
FIG. 1 is a block diagram showing a system for correcting an error of acquired data according to the embodiment.

Terms and words used in the specification and the claims shall not be interpreted as commonly-used dictionary meanings, but shall be interpreted as to be relevant to the technical scope of the invention based on the fact that the inventor may property define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

FIG. 1 is a block diagram showing a system for correcting an error of acquired data according to the embodiment.

Referring to FIG. 1, the system for correcting an error of acquired data may include a data correcting apparatus 100 and a remote control apparatus 150.

The data correcting apparatus 100 may include a communication unit 110, a memory unit 120, an error determining unit 130 and a control unit 140.

The communication unit 110 may receive data generated from a plurality of remote control apparatuses 150 included in the remote control system. The communication unit 110 may transmit information about states of a circuit breaker and a disconnecting switch, which is identified by the error determining unit 130 and the control unit 140 with reference to the received data, to a specific remote control apparatus.

The memory unit 120 may store the data received through the communication unit 110 and may store accumulated weight of the circuit breaker and the disconnecting switch determined by the error determining unit 130. Further, the memory unit 120 may store the fact whether the circuit breaker is identical with the disconnecting switch and an amount of a leakage current according to electric energy. That is, when the error determining unit 130 identifies electric power states of the circuit breaker, the disconnecting switch, a station, a bus, etc., the memory unit 120 may store a predetermined range of an error electric power value.

The error determining unit 130 may determine whether the operation of the circuit breaker is consistent with that of the disconnecting switch or not, and may assign a weight according to the determination result.

The error determining unit 130 determines whether the switchings of the circuit breaker and the disconnecting switch are consistent with each other or not based on the data acquired from the remote control apparatus 150. The error determining unit 130 may determine whether electric power exists or not at a state that the circuit breaker and the disconnecting switch are opened. The error determining unit 130 may determine whether the electric powers input from and output to the station including the circuit breaker and the disconnecting switch are equal to each other or not. Further, the error determining unit 10 may determine whether the electric power input from and output to the bus connected to the circuit breaker and the disconnecting switch are equal to each other or not. The error determining unit 130 may assigns a weight to an error according to the determination result.

The control unit 140 identifies the weight accumulated according to the determination result by the error determining unit 130 about whether the circuit breaker is consistent with the disconnecting switch or not. The control unit 140 may identify an error of the station including the circuit breaker and the disconnecting switch which exceeds a predetermined accumulated weight. Further, error information may be transmitted to the corresponding station through the communication unit 110 according to the identification result.

Hereinafter, the operation of correcting an error of acquired data performed by the system for correcting an error of acquired data mentioned above will be described with reference to FIG. 2.

FIG. 2 is a flowchart illustrating the operation of correcting an error of acquired data according to the embodiment.

Referring to FIG. 2, in step S200, the apparatus 100 may receive data from at least one remote control apparatus 150.

In step S210, the apparatus 100 may identify whether an error occurs in data with reference to the acquired data.

In order to identify whether an error exists in the acquired data, the apparatus 100 may identify whether the operations of the circuit breaker/the disconnecting switch are consistent with each other, whether the states of the circuit breaker and the disconnecting switch according to the circuit-openings of the circuit breaker and the disconnecting switch are consistent with each other, whether the electric powers input to or output from the station are consistent with each other, and whether the electric powers are input/output through the bus.

The apparatus 100 identifies whether the circuit breaker and the disconnecting switch existing in one station are circuit-opened or not based on the acquired data from the remote control apparatus 150. If the apparatus 100 determines that the states of the circuit breaker and the disconnecting switch included in one station are inconsistent with each other in step S211, the apparatus assigns a weight to the station including the circuit breaker and the disconnecting switch in step S212.

Further, the apparatus 100 senses a current value corresponding to a leakage current in the state that the circuit breaker and the disconnecting switch are circuit-opened. In this case, in step S213, when the value of the leakage current input and output in the state that the circuit breaker and the disconnecting switch are circuit-opened is equal to or greater than a predetermined current value, the apparatus 100 determines that the sates of the circuit breaker and the disconnecting switch are inconsistent with each other.

Thus, in step S214, the apparatus 100 may assign a weight to the station in which the measured current value is equal to or greater than a value in a predetermined range in the state that the identified circuit breaker and disconnecting switch are circuit-opened.

Further, in step S215, the apparatus 100 identifies whether the electric powers input to and output from the station included in each remote control apparatus 150 are consistent with each other or not. That is, the apparatus 100 identifies whether the electric powers input to and output from at least one station included in the remote control apparatus 150 are equal to each other or not. In step S216, when electric power exceeding a predetermined error range is sensed, a weigh is assigned to the corresponding circuit breaker and disconnecting switch.

In step S217, the apparatus 100 determines whether the electric powers input to and output from the bus connected to the station included in the remote control apparatus 150 are consistent with each other.

In step S218, when the electric powers input to and output from the bus connected to the station included in the remote control apparatus 150 exceeds a predetermined error range, the apparatus 100 determines that the operation states of the corresponding circuit breaker and disconnecting switch are inconsistent with each other and assigns a weight thereto.

In step S219, the apparatus 100 accumulates the weight for determining whether an error occurs in the data of the circuit breaker and the disconnecting switch included in each station, and identifies the accumulated value.

The apparatus 100 may set the priority of generating an alarm according to the accumulated weight. The apparatus 100 identifies the circuit breaker and the disconnecting switch having an accumulated weight in the predetermined range or the greatest accumulated weight. According to the identification result, the apparatus 100 may set the priority of providing an alarm to the station including the corresponding circuit breaker and disconnecting switch.

The alarm priority is provided for the purpose of informing the station including the circuit breaker and the disconnecting switch having a higher accumulated weight about an error.

In step, the apparatus 100 may generate an alarm for informing the station about an operation error and may output the generated alarm to the corresponding station according to the set priority.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of correcting an error of acquired data, the method comprising:
   determining whether states of at least one circuit breaker and at least one disconnecting switch included in at least one station are consistent with each other based on data received from at least one remote control apparatus including the at least one station;
   assigning a weight to a corresponding circuit breaker and a corresponding disconnecting switch and the station including the corresponding circuit breaker and the corresponding disconnecting switch when the determination result represents that the states of the circuit breaker and the disconnecting switch are inconsistent with each other;
   creating alarm information notifying a malfunction of the corresponding circuit breaker and the corresponding disconnecting switch when an accumulated weight value is equal to or greater than a preset reference weight value; and
   outputting an alarm corresponding to the alarm information.

2. The method of claim 1, wherein the determining of the states of the circuit breaker and the disconnecting switch includes determining whether switching states of the circuit breaker and the disconnecting switch are consistent with each other.

3. The method of claim 2, wherein the determining of the switching states of the circuit breaker and the disconnecting switch includes determining that the circuit breaker and the disconnecting switch are inconsistent with each other when electric power exceeding a predetermined error range is sensed.

4. The method of claim 1, wherein the determining of the states of the circuit breaker and the disconnecting switch includes determining whether electric power exists in a state that the circuit breaker and the disconnecting switch are circuit-opened.

5. The method of claim 1, wherein the determining of the states of the circuit breaker and the disconnecting switch includes determining whether values of electric powers, which are input to and output from the station including the circuit breaker and the disconnecting switch, are consistent with each other.

6. The method of claim 5, further comprising setting a predetermined error range for the electric power input to and output from the station including the at least one circuit breaker and the at least one disconnecting switch, and determining that the circuit breaker and the disconnecting switch are inconsistent with each other when the electric power exceeding the error range is sensed.

7. The method of claim 1, further comprising determining whether electric powers input to and output from the station through a bus connected to the station including the circuit breaker and the disconnecting switch are consistent with each other.

8. The method of claim 7, further comprising:
   setting a predetermined error range for the electric powers input to and output from the station through the bus connected to the station including the at least one circuit breaker and the at least one disconnecting switch; and
   determining that the states of the circuit breaker and the disconnecting switch are inconsistent with each other when values of the electric powers deviating from the error rang are sensed.

9. An apparatus for correcting an error of acquired data, the apparatus comprising:
   a communication unit for receiving data generated from at least one remote control apparatus including at least one station;
   an error determining unit for determining whether states of at least one circuit breaker and at least one disconnecting switch included in the station are consistent with each other based on the data received through the communication unit and assigning a weight according to a determination result;
   a memory unit for storing an accumulated weight of the circuit breaker and the disconnecting switch assigned by the error determining unit; and
   a control unit for identifying the accumulated weight that is accumulated according to state consistency of the circuit breaker and the disconnecting switch determined by the error determining unit and identifying an error of the station including the circuit breaker and the disconnecting switch based on the accumulated weight.

10. The apparatus of claim 9, wherein the error determining unit determines whether switching states of the circuit breaker and the disconnecting switch are consistent with each other, and assigns the weight to the circuit breaker and the disconnecting switch when switching states of the circuit breaker and the disconnecting switch are inconsistent with each other.

11. The apparatus of claim 9, wherein the error determining unit determines whether an electric power exists in a state that the circuit breaker and the disconnecting switch are circuit-opened, and assigns the weight to the circuit breaker and the disconnecting switch when a value of the electric power exceeding a predetermined range is sensed.

12. The apparatus of claim 9, wherein the error determining unit identifies whether electric powers input to and output from the station including the at least one circuit breaker and the at least one disconnecting switch are consistent with each other, and assigns the weight to the corresponding circuit breaker and the corresponding disconnecting switch when a value of the electric power exceeds a predetermined range.

13. The apparatus of claim 9, wherein the error determining unit determines whether electric powers input to and output from the station through a bus connected to the station including the circuit breaker and the disconnecting switch are consistent with each other, and assigns the weight to the corresponding circuit breaker and the corresponding disconnecting switch when a value of the electric power exceeds a predetermined range.

14. The apparatus of claim 9, wherein the communication unit outputs error information to the station including the corresponding circuit breaker and the corresponding disconnecting switch when a determination result of the control unit represents that the accumulated weight exceeds a reference value.

* * * * *